United States Patent
Slopsema et al.

(10) Patent No.: US 6,886,519 B2
(45) Date of Patent: May 3, 2005

(54) METHODS AND APPARATUS FOR CONTROLLING A SHUTDOWN OF AN INTERNAL COMBUSTION ENGINE

(75) Inventors: Thomas Alan Slopsema, Holt, MI (US); Randall S. Beikmann, Brighton, MI (US); Paul Alan Bauerle, Fenton, MI (US); Julie S. Fuller, West Bloomfield, MI (US); Stuart R. Smith, Howell, MI (US); Helmut L. Oswald, Albig (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/870,428

(22) Filed: May 30, 2001

(65) Prior Publication Data

US 2002/0179031 A1 Dec. 5, 2002

(51) Int. Cl.[7] .............................................. F02B 75/06
(52) U.S. Cl. .................................. 123/192.1; 123/333
(58) Field of Search ............................ 123/192.1, 396, 123/198 D, 179.4, 330, 331, 332, 333, 174.9, 198 DB, 198 DC

(56) References Cited

U.S. PATENT DOCUMENTS

| 4,090,481 | A | * | 5/1978 | Gospodar ............ 123/198 DC |
| 4,574,752 | A | * | 3/1986 | Reichert, Jr. et al. . 123/198 DB |
| 5,521,825 | A | | 5/1996 | Unuvar et al. ......... 364/431.05 |
| 5,563,453 | A | * | 10/1996 | Nyfelt ........................ 307/10.2 |
| 5,720,258 | A | | 2/1998 | Tolkacz et al. ............. 123/352 |
| 5,730,098 | A | * | 3/1998 | Sasaki et al. ......... 123/198 DB |
| 5,749,343 | A | | 5/1998 | Nichols et al. ............. 123/350 |
| 6,167,343 | A | | 12/2000 | Bauerle ...................... 701/110 |
| 6,257,194 | B1 | * | 7/2001 | Kerns et al. ............ 123/198 D |
| 6,283,079 | B1 | * | 9/2001 | Cumming et al. ....... 123/192.1 |

* cited by examiner

*Primary Examiner*—Noah P. Kamen
*Assistant Examiner*—Arnold Castro
(74) *Attorney, Agent, or Firm*—Christopher DeVries

(57) ABSTRACT

Methods and apparatus are provided for controlling a shutdown of an internal combustion engine. The apparatus comprises an intake manifold configured to conduct an intake charge of air to an intake port of the internal combustion engine and a throttle configured to alter the intake charge of air to the intake port of the internal combustion engine. The apparatus further comprises a controller configured to control the throttle such that a substantial termination of the intake charge of air is provided during the shutdown of the internal combustion engine.

20 Claims, 2 Drawing Sheets

METHODS AND APPARATUS FOR CONTROLLING A SHUTDOWN OF AN INTERNAL COMBUSTION ENGINE

TECHNICAL FIELD

The present invention generally relates to an internal combustion engine, and more particularly to methods and apparatus for controlling a shutdown of an internal combustion engine.

BACKGROUND OF THE INVENTION

Operation of an internal combustion engine generally includes adjusting the fuel injectors and engine spark. In addition, operation of an internal combustion engine generally includes adjusting a throttle to control the amount of air that flows through an intake manifold to an intake port of the internal combustion engine. During a shutdown of the internal combustion engine, the fuel injectors are adjusted so that fuel injection is discontinued and engine spark is halted. However, control of the amount of air that flows through the intake manifold to the intake port of the combustion chamber can be limited to an open loop control of the throttle to a default position that provides an intake manifold that is significantly open.

At low operating speeds of an internal combustion engine that corresponds to a shutdown, a significantly open intake manifold allows the manifold pressure to increase and also allows a greater charge of air into the cylinders of the engine. As can be appreciated by one of ordinary skill in the art, an increase in the manifold pressure and a greater charge of air into the cylinders of the engine causes the engine cylinders to compress full charges of air, and increased torque pulses are exerted on the engine block. Minimal pumping work is typically necessary to bring in the air charge. Therefore, the engine shutdown event is extended due to the lack of throttling losses, and a significant back and forth roll can exist during engine shutdown at a frequency corresponding to the engine firing frequency. This back and forth roll at a frequency corresponding to the engine firing order, which is generally know as engine shudder, is undesirable.

In view of the foregoing, it should be appreciated that it would be desirable to provide methods and apparatus for controlling a vehicle engine such that engine shudder is minimized during a shutdown of the vehicle engine. Furthermore, additional desirable features will become apparent to one skilled in the art from the foregoing background of the invention and following detailed description of a preferred exemplary embodiment and appended claims.

SUMMARY OF THE INVENTION

In accordance with the teachings of the present invention, methods and apparatus are provided for controlling an internal combustion engine during shutdown. The apparatus comprises an intake manifold configured to conduct an intake charge of air to an intake port of the internal combustion engine and a throttle configured to alter the intake charge of air to the intake port of the internal combustion engine. The apparatus further comprises a controller configured to control the throttle such that a substantial termination of the intake charge of air is provided during the shutdown of the internal combustion engine.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of a preferred exemplary embodiment of the invention is mainly exemplary in nature and is not intended to limit the invention or the application or use of the invention.

Figure 1:
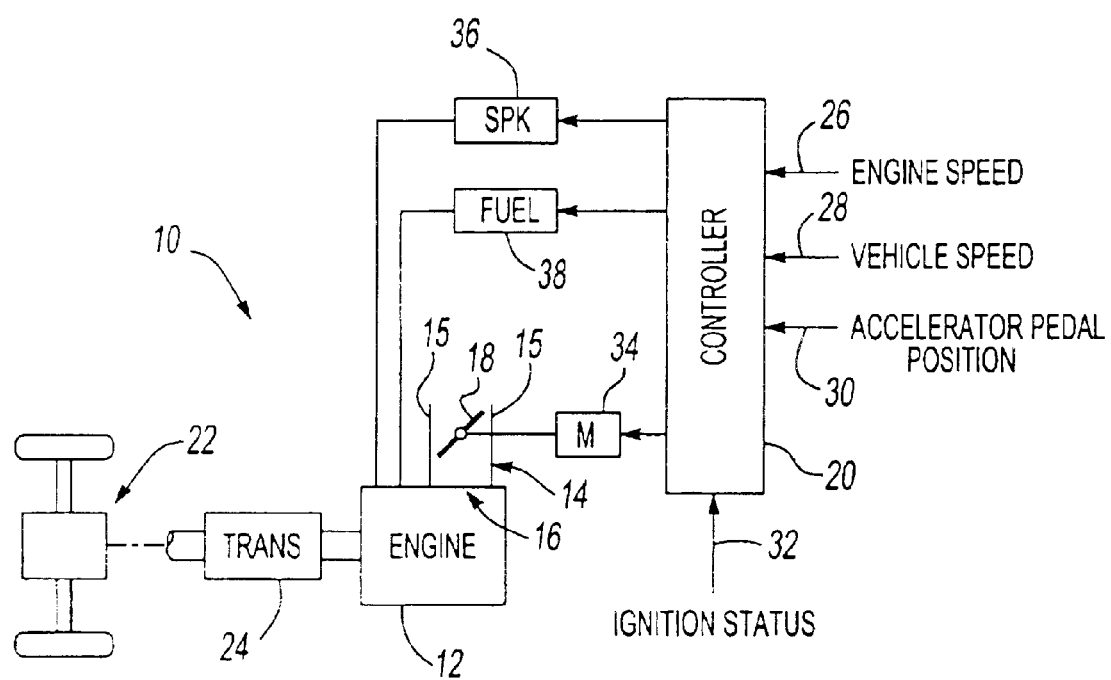
FIG. 1 is an apparatus for controlling a shutdown of an internal combustion engine according to a preferred exemplary embodiment of the present invention.

Referring to FIG. 1, an apparatus 10 is shown for controlling a shutdown of an internal combustion engine 12, which is preferably a spark ignition internal combustion engine. The apparatus 10 for controlling the shutdown of the internal combustion engine 12 is comprised of an intake manifold 14 configured to conduct an intake charge of air to an intake port 16 of the internal combustion engine 12 and a throttle 18 configured to alter the intake charge of air to the intake port 16 of the internal combustion engine 12. The apparatus 10 is also comprised of a controller 20 configured to control the throttle 18 during shutdown of the internal combustion engine 12 such that a substantial termination of the intake charge of air is provided during the shutdown of the internal combustion engine 12.

The controller 20 is preferably configured to control the position of the throttle 18 to adjust the power provided by the engine 12 for driving a drive mechanism 22 of a vehicle (e.g., wheels for an automobile) coupled to the engine 12 with a transmission 24. While the present invention is particularly directed to an automobile, the present invention is applicable to any number of land, water, air or space vehicles utilizing an internal combustion engine. The controller 20 preferably operates in response to a number of inputs such as engine speed 26, vehicle speed 28, or accelerator pedal position 30, for example. In addition, the controller 20 operates in response to an ignition status signal 32. Generally, the controller 20 activates a throttle motor 34 to position the throttle 18 at a throttle position that provides an opening of the intake port 16 that is a percentage of a substantially unobstructed intake port (i.e., a throttle position that provides a percentage of the maximum flow rate of the intake charge of air through the intake manifold 14). The percentage of the substantially unobstructed intake port is based upon any number of operating parameters of the engine, including engine spark 36, fuel injection 38 and the ignition status 32.

According to a preferred exemplary embodiment of the present invention, the throttle 18 is disposed within the intake manifold 14 and pivotally mounted to provide a percentage of the substantially unobstructed intake port 16 based upon the angle of the throttle 18 with respect to intake port 16. For example, the throttle 18 having such a configuration can be configured such that the throttle 18 is substantially parallel to the walls 15 of the intake manifold 14 and/or substantially perpendicular to the intake port 16 to provide a substantially unobstructed intake port 16 (i.e., about zero percent of the intake port 16 is obstructed with the throttle 18 at a 90 degree angle with respect to the intake port 16 so that about 100 percent of the flow rate capacity through the intake manifold 14 to the intake port 16 is available). In addition, the throttle 18 having such a configuration can be configured such that the throttle 18 is substantially perpendicular to the walls 15 of the intake manifold 14 and/or substantially parallel to the intake port 16 to provide a substantially obstructed intake port 16 (i.e., about 100 percent of the intake port 16 is obstructed with the throttle 18 at a zero degree angle with respect to the intake port 16 so that about zero percent of the flow rate capacity through the intake manifold 14 to the intake port 16 is available). Furthermore, the throttle 18 having such a configuration can be configured to provide any angle between zero degrees and 90 degrees with respect to the walls 15 of the intake manifold 14 and/or the intake port 16 to provide a percentage of the unobstructed intake port (e.g. 45 degrees provides about 45 percent of the flow rate capacity through the intake manifold 14 for this example. In practice, this relationship is often non-linear and depends upon engine speed.). However, it should be understood that any number of throttle, intake manifold and intake port configurations can be utilized in accordance with the present invention to provide a shutdown under the control of the controller 20 once an ignition status indicating an engine shutdown has been identified by the controller 20.

Once the controller 20 recognizes an ignition status 32 that indicates an engine shutdown, the controller 20 preferably adjusts the engine spark 36 and fuel injection 38 to terminate operation of the engine (i.e., provide an engine shutdown). In addition, the controller 20 adjusts the throttle 18 such that intake charge of air through the intake manifold 16 is substantially terminated for a period of time after the controller 20 initiates the shutdown event. Preferably, the throttle 18 is adjusted after the engine spark and fuel injection are adjusted to provide an engine shutdown.

The period of time after the controller initiates the shutdown event is preferably selected such that the engine speed is about zero or below the speed at which shudder occurs. Preferably, the period of time after the controller 20 initiates a shutdown is less than about 20 seconds, more preferably less than about 15 seconds and more preferably less than about 10 seconds. However, as can be appreciated by one of ordinary skill in the art, the speed range at which engine shudder occurs varies for specific engine designs and configurations. Therefore, the period of time can be greater than or equal to about 20 seconds. The throttle 18 is preferably adjusted during the period of time such that the flow rate of the intake charge of air is less than about twice the flow rate through the intake manifold 14 provided for an engine idle speed (i.e., idle speed flow rate), more preferably less than about the idle speed flow rate, even more preferably less than about 30 percent of the idle speed flow rate and most preferably less than about 10 percent of the idle speed flow rate.

Figure 2:
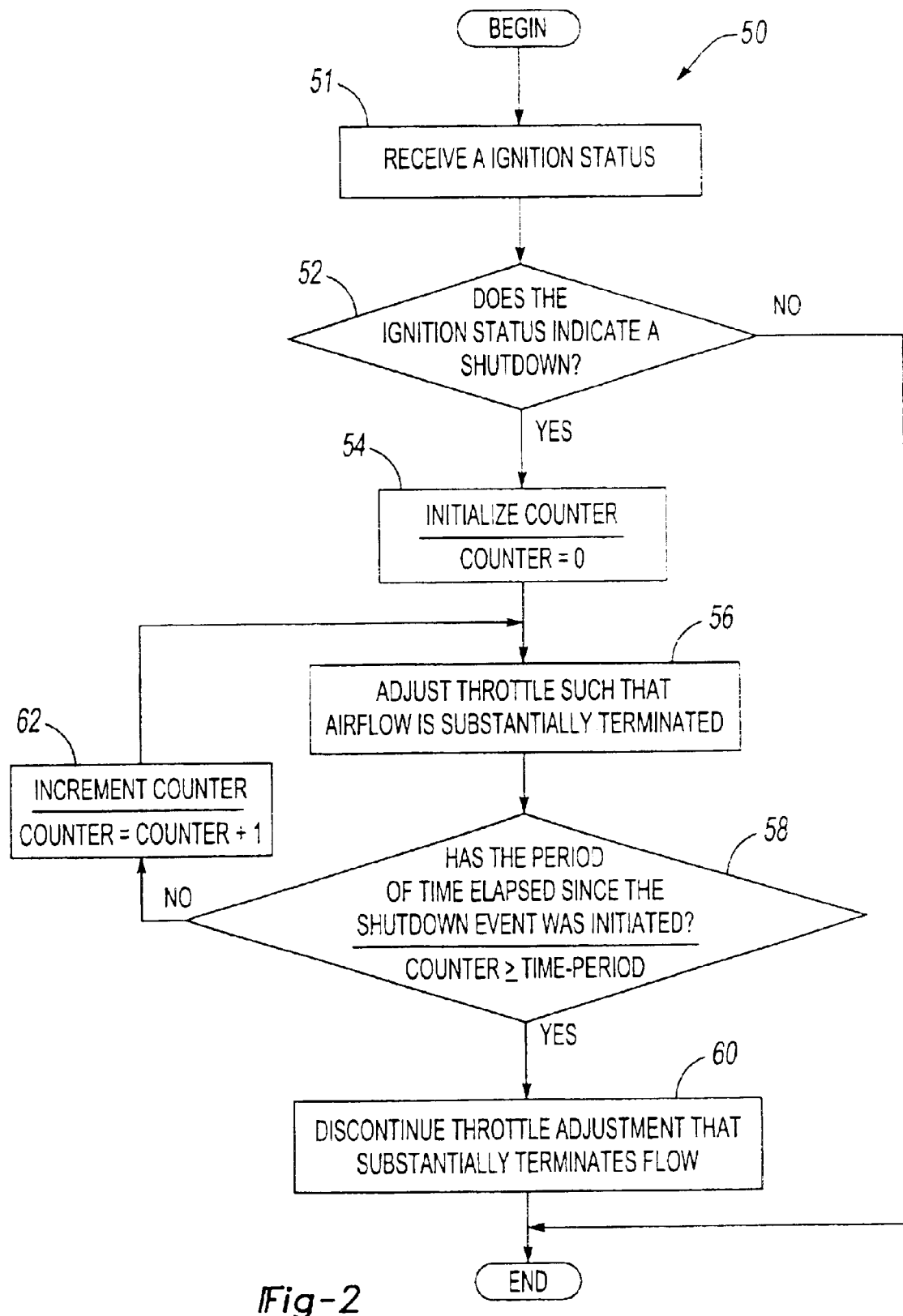
FIG. 2 is a flow chart illustrating the method of controlling a shutdown of the internal combustion engine as preferably implemented by the controller of FIG. 1 according to a preferred exemplary embodiment of the present invention.

FIG. 2 is a flow chart illustrating the method 50 of controlling a shutdown of the internal combustion engine as preferably implemented by the controller 20 of FIG. 1 for the period of time after the initiation of a shutdown event. However, the method 50 can be implemented by any number of apparatus. Initially, the method 50 receives the ignition status 51 and evaluates the ignition status to determine whether a request has been made for an engine shutdown 52. If a request has not been made for an engine shutdown, the method ends. However, if a request has been made for an engine shutdown, the method 50 continues.

More specifically, if a request has been made for an engine shutdown, a counter is initialized to zero 54. Once the counter has been initialized to zero 54, the throttle is adjusted such that an intake charge of air through the intake manifold to an intake port of the internal combustion engine is substantially terminated 56. Preferably, as previously described in this detailed description of a preferred exemplary embodiment, the throttle is adjusted for less than about twice the idle speed flow rate, more preferably less than about the idle speed flow rate, even more preferably less than about 30 percent of the idle speed flow rate and most preferably less than about 10 percent of the idle speed flow rate.

After the throttle is adjusted such that an intake charge of air through the intake manifold to the intake port is substantially terminated 56, the counter is evaluated to determine if the period of time (Time_Period) has elapsed since the controller initiated the shutdown event 58. As previously discussed in this detailed description of a preferred exemplary embodiment, the period of time is preferably selected such that the engine speed is about zero or below the speed at which shudder occurs. More preferably, the period of time after the controller 20 initiates a shutdown is less than about 20 seconds, even more preferably less than about 15 seconds and most preferably less than about 10 seconds. However, as previously discussed in this detailed description of a preferred exemplary embodiment, the speed range at which engine shudder occurs varies for specific engine designs and configurations. Therefore, the period of time can be greater than or equal to about 20 seconds. If the counter is greater than or equal to the period of time, the period of time has elapse since the shutdown and the throttle adjustment is discontinued 60 in accordance with a preferred exemplary embodiment of the present invention. Otherwise, if the counter is less than the period of time, the counter is incremented 62 and the method 50 repeats with the throttle adjustment for a substantial termination of the intake charge of air through the intake manifold to the intake port 56, and so forth.

From the foregoing description, it should be appreciated that methods and apparatus are provided for controlling an internal combustion engine such that engine shudder is minimized during an engine shutdown. While a preferred exemplary embodiment has been presented in the foregoing detailed description of a preferred exemplary embodiment, it should be appreciated that a vast number of variations in the embodiments exist. It should also be appreciated that this preferred exemplary embodiment is only an example and is not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

What is claimed is:

1. An apparatus for controlling the shutdown of an internal combustion engine, comprising:

an intake manifold configured to conduct an intake charge of air to an intake port of the internal combustion engine;

a throttle configured to alter said intake charge of air to said intake port of the internal combustion engine;

a controller configured to control said throttle such that a substantial termination of said intake charge of air is provided during the shutdown of the internal combustion engine; and wherein said controller is further configured to halt a fuel injection during the shutdown of the internal combustion engine.

2. The apparatus of claim 1, wherein said controller is configured to control said throttle such that said substantial termination of said intake charge of air is provided for a predetermined period of time after initiation of the shutdown of the internal combustion engine.

3. The apparatus of claim 1, wherein said controller is further configured to terminate an engine spark during the shutdown of the internal combustion engine.

4. The apparatus of claim 1, wherein said substantial termination of said intake charge of air provides a flow rate through said intake manifold that is less than about twice an idle speed flow rate through said intake manifold.

5. The apparatus of claim 1, wherein said substantial termination of said intake charge of air provides a flow rate through said intake manifold that is less than about an idle speed flow rate through said intake manifold.

6. The apparatus of claim 1, wherein said substantial termination of said intake charge of air provides a flow rate through said intake manifold that is less than about thirty percent of an idle speed flow rate through said intake manifold.

7. The apparatus of claim 1, wherein said substantial termination of said intake charge of air provides a flow rate through said intake manifold that is less than about ten percent of an idle speed flow rate through said intake manifold.

8. The apparatus of claim 1, wherein the internal combustion engine is a spark ignition internal combustion engine.

9. A method of controlling the shutdown of an internal combustion engine, comprising:
   receiving an ignition status indicative of a request to shutdown the internal combustion engine;
   evaluating said ignition status to determine said request to shutdown the internal combustion engine; and
   adjusting a throttle for a substantial termination of an intake charge of air through an intake manifold to an intake port of the internal combustion engine if said ignition status indicates said request to shutdown the internal combustion engine.

10. The method of claim 9, wherein adjusting said throttle for said substantial termination of said intake charge of air through said intake manifold to said intake port of the internal combustion engine is provided for a predetermined period of time.

11. The method of claim 9, further comprising adjusting an engine spark during the shutdown of the internal combustion engine.

12. The method of claim 9, further comprising adjusting a fuel injection during the shutdown of the internal combustion engine.

13. The method of claim 9, wherein said substantial termination of said intake charge of air provides a flow rate through said intake manifold that is less than about twice an idle speed flow rate through said intake manifold.

14. The method of claim 9, wherein said substantial termination of said intake charge of air provides a flow rate through said intake manifold that is less than about an idle speed flow rate through said intake manifold.

15. The method of claim 9, wherein said substantial termination of said intake charge of air provides a flow rate through said intake manifold that is less than about thirty percent of an idle speed flow rate through said intake manifold.

16. The method of claim 9, wherein said substantial termination of said intake charge of air provides a flow rate through said intake manifold that is less than about ten percent of an idle speed flow rate through said intake manifold.

17. The method of claim 9, wherein the internal combustion engine is a spark ignition internal combustion engine.

18. An apparatus for controlling the shutdown of an internal combustion engine, comprising:
   an intake manifold configured to conduct an intake charge of air to an intake port of the internal combustion engine;
   an electronic throttle configured to alter said intake charge of air to said intake port of the internal combustion engine; and
   a computerized controller configured to control said throttle such that a substantial termination of said intake charge of air is provided during the shutdown of the internal combustion engine.

19. An apparatus far controlling the shutdown of an internal combustion engine, comprising:
   an intake manifold configured to conduct an intake charge of air to an intake port of the internal combustion engine;
   an electronic throttle configured to alter said intake charge of air to Bald intake port of the internal combustion engine, wherein said electronic throttle includes and electric motor to move a throttle plate; and
   a computerized controller configured to control said throttle such that a substantial termination of said intake charge of air is provided during the shutdown of the internal combustion engine.

20. An apparatus for controlling the shutdown of an internal combustion engine, comprising:
   an intake manifold configured to conduct an intake charge of air to an intake port of the internal combustion engine;
   an electronic throttle configured to alter said intake charge of air to said intake port of the internal combustion engine, wherein said electronic throttle includes and electric motor to move a throttle plate; and
   a controller configured to control said throttle such that a substantial termination of said intake charge of air is provided during the shutdown of the internal combustion engine.

* * * * *